Figure 1:
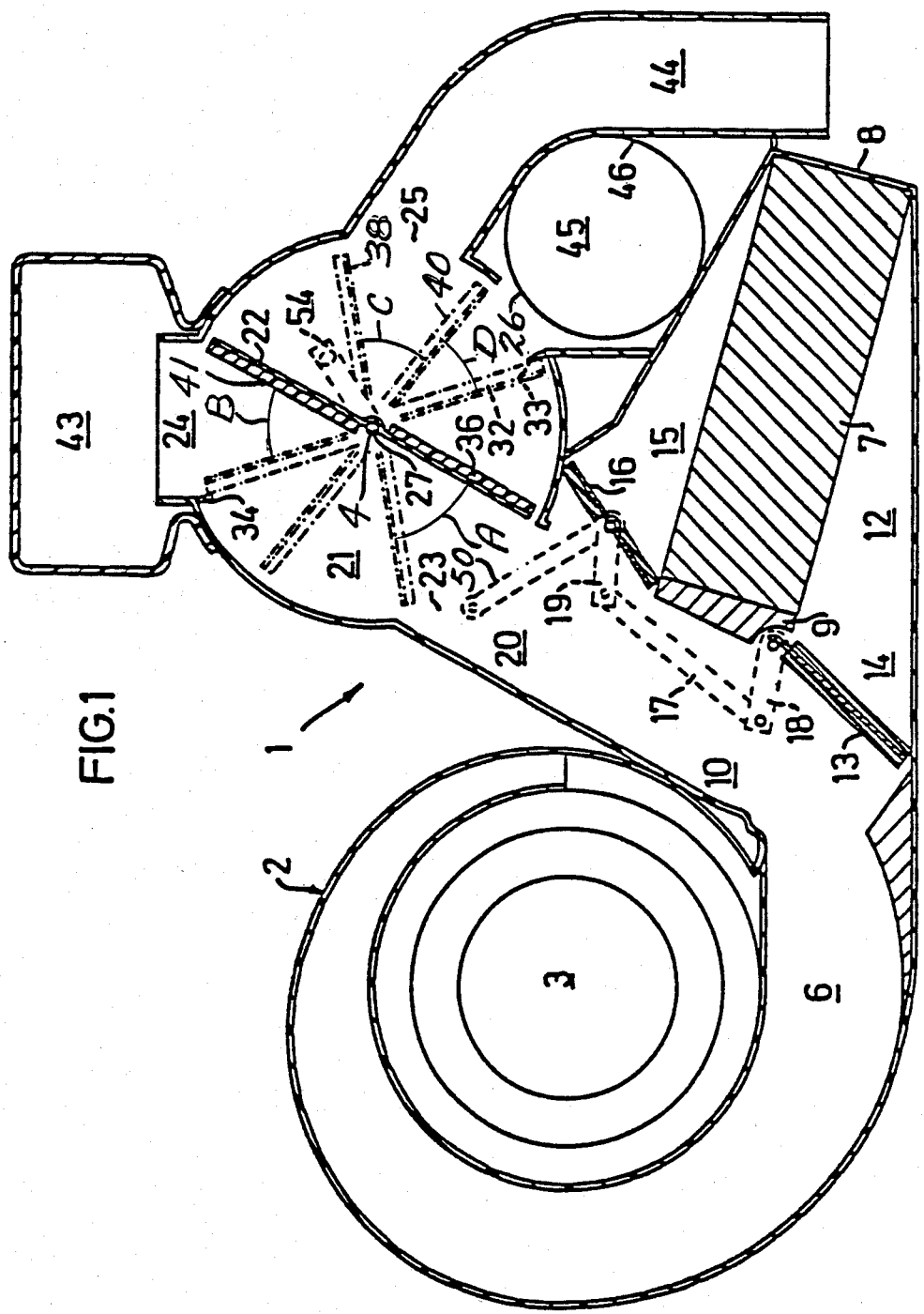

United States Patent [19]

Nilsson et al.

[11] Patent Number: 4,519,302
[45] Date of Patent: May 28, 1985

[54] ARRANGEMENT FOR DISTRIBUTING VENTILATION AIR IN VEHICLES

[75] Inventors: Sten E. Nilsson, Vargön; Sven E. Elfverson, Trollhättan, both of Sweden

[73] Assignee: Saab-Scania Aktiebolag, Sodertalje, Sweden

[21] Appl. No.: 628,961

[22] Filed: Jul. 9, 1984

Related U.S. Application Data

[63] Continuation of Ser. No. 462,070, Jan. 28, 1983, abandoned, which is a continuation of Ser. No. 236,042, Feb. 20, 1981.

[30] Foreign Application Priority Data

Feb. 27, 1980 [SE] Sweden ................................ 8001515

[51] Int. Cl.³ .............................................. B60H 1/00
[52] U.S. Cl. ...................................... 98/2.08; 98/2.06; 137/625.46; 137/876
[58] Field of Search .................. 98/2, 2.05, 2.06, 2.08; 137/625.44, 625.46, 875, 876

[56] References Cited

U.S. PATENT DOCUMENTS

| 2,018,543 | 10/1935 | Buirk | 137/887 X |
| 2,164,057 | 6/1939 | Fink | 137/625.46 X |
| 3,661,069 | 5/1972 | Grosseau | 98/2.05 |

FOREIGN PATENT DOCUMENTS

| 66246 | 6/1977 | Japan | 98/2.05 |
| 7001695 | 2/1974 | Sweden . | |
| 388588 | 3/1933 | United Kingdom . | |
| 1270884 | 4/1972 | United Kingdom . | |
| 1508908 | 4/1978 | United Kingdom . | |

Primary Examiner—Harold Joyce
Attorney, Agent, or Firm—Cushman, Darby & Cushman

[57] ABSTRACT

An arrangement for distributing ventilation air in a vehicle includes a ventilation housing with at least one air distribution means for distributing air to a plurality of different outlets. A substantially cylindrical distribution chamber in said ventilation housing has an inlet and several outlets distributed circumferentially in its wall. Within said chamber there is a pivotable flap for controlling the outlets. At least three outlets are arranged within an angular sector of 180° or less, and these outlets open out via separate ducts at given outlet locations in the vehicle passenger compartment.

11 Claims, 4 Drawing Figures

ARRANGEMENT FOR DISTRIBUTING VENTILATION AIR IN VEHICLES

This is a continuation of application Ser. No. 462,070 filed Jan. 28, 1983 now abandoned, which is a continuation of application Ser. No. 236,042, filed Feb. 20, 1981 now abandoned.

The present invention relates to an arrangement for distributing ventilation air in a vehicle, including a ventilation housing with at least one air distribution means for distributing air flowing into the ventilation housing to a plurality of different outlets, said ventilation housing being formed with a substantially cylindrical distribution chamber having an inlet and a number of outlets located in its cylindrical mantle surface, said air distribution means comprising a flap extending in the longitudinal direction of the distribution chamber and being supported by the ventilation housing, pivotable about the centreline of the distribution chamber.

As a rule, ventilation systems arranged in vehicles include a ventilation housing into which air is led and heated before the air is supplied to the vehicle passenger compartment via a plurality of outlets and nozzles placed in different parts of the passenger compartment. Such outlets and nozzles are, for example, defroster nozzles, fascia board nozzles or vents and/or floor nozzles or vents. The distribution of ventilation air between such outlets is usually provided by means of a plurality of different flaps, which can be caused to open or close communication between the ventilation housing and the respective nozzles. In the use of three different nozzles according to the above example, it is usual to use three different flaps for their regulation.

It is also known to combine two of these flaps into one flap. A combined flap for defroster outlet and floor outlet is thus known. In such cases, if an outlet for the nozzle placed on the vehicle fascia board is also desired, a special flap is required for this purpose. This signifies that there are two separate flaps to regulate and that separate controls are also required as well as two separate translation means to enable carrying out the regulation in question. Such a ventilation system thereby requires a relatively complicated structure of flaps and control means, and the ventilation housing must usually be made voluminous to accommodate ingoing components. In turn, this results in that said known solution is comparatively heavy and costly.

The present invention has the object of eliminating the said drawbacks and relates to an arrangement which enables a simpler and cheaper distribution of ventilation air to a plurality of different outlets in a vehicle passenger compartment.

This is achieved according to the invention in that the distribution chamber is formed with at least three outlets which are arranged within an angular sector of 180° or less, and that each outlet from the distribution chamber is arranged, via separate ducts, to open out at given outlet locations in the vehicle passenger compartment.

By using a single flap to control a number of outlets, a simple arrangement is obtained that is easy to operate.

Figure 2:
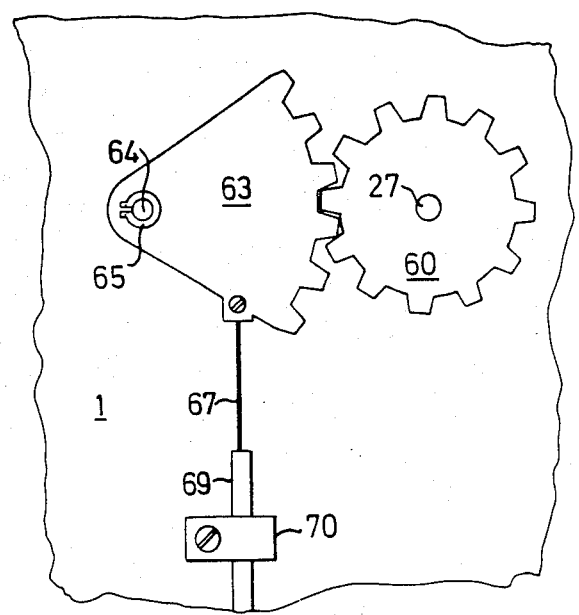
Figure 3:
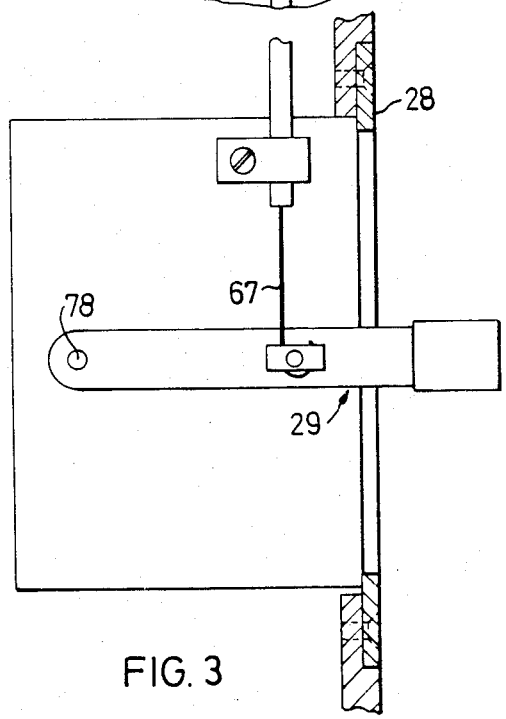
Figure 4:
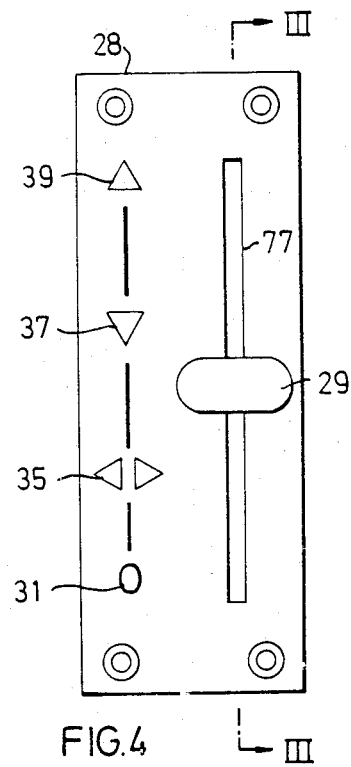

Further advantages will be apparent from the following description of an embodiment exemplifying the invention. The description is made with reference to the attached drawings, in which FIG. 1 is a cross section of a ventilation housing formed in accordance with the invention, FIG. 2 is a plan view of a motion translation means between a control and a distribution flap, FIG. 3 is a section along the line III—III in FIG. 4, illustrating a control means for a distribution flap, and FIG. 4 is a plan view of a control panel for the control means.

A heating and ventilation system formed in accordance with the invention includes a ventilation housing 1, conventionally arranged in a vehicle for leading ventilation air to a plurality of nozzles opening out into the vehicle passenger compartment. The ventilation housing 1, preferably manufactured from a plastics material, comprises two housing halves 2 with a parting plane arranged in the longitudinal direction of the housing 1. The housing halves 2, of which one is illustrated in FIG. 1, are substantially alike but one is a mirror inversion of the other. A transverse recess 3 in the ventilation housing 1 is intended for accommodating an electric centrifugal fan (not shown). The fan is conventionally provided with a fixing flange intended for screwing to the ventilation housing 1. The fan is adapted for sucking in air via an air intake and an axial inlet, the fan then blowing the air into an inlet chamber 6 in the ventilation housing 1.

A heat exchanger is mounted between the housing halves 2, this heat exchanger also bearing against a side surface 8 of the ventilation housing 1. The housing halves 2 are provided with a plurality of protuberances (not shown) which further locate the heat exchanger 7. The two housing halves 2 are each formed with a transverse supporting member 9 mutually engaging on assembly. Said supporting members 9 serve as further support for the heat exchanger 7 and also as heat insulation for it in respect of a cold air duct 10 in the ventilation housing 1. The heat exchanger 7 is adapted for a continuous flow-through of heated coolant from the vehicle engine, and with respect to this the heat exchanger is provided with an inlet pipe and an outlet pipe (not shown).

The inlet chamber 6 of the ventilation housing 1 is in communication with a cold air duct 10 and a hot air duct 12, of which the latter can be regarded as constituting a parallel branch conduit to the first-mentioned duct, and vice versa. A pivotably mounted flap 13 is arranged at the inlet 14 of the hot air duct 12 to regulate the amount of air supplied to said duct 12. Such led-in air is caused to pass the heat exchanger 7 and is there heated in a known manner. The outlet 15 of the hot air duct 12 is also provided with a pivotably mounted flap 16 to enable an exact control of the amount of air passing through the hot air duct 12. The second flap 16 is connected to the first flap 13 such that a connecting link 17 connects a lever 18 for turning the flap 13 with a lever 19 for turning the second flap 16.

Air which is led solely through the cold air duct 10 is not heated. The previously-mentioned supporting members 9 thereby constitute a heat insulation in relation to the hot air duct 12 and the heat exchanger 7.

Air led through the cold air duct 10 and the hot air duct 12 in the ventilation housing 1 is subsequently mixed in a mixing chamber 20, the proportions between cold and hot air determining the temperature for air departing from the mixing chamber 20. This air is taken to a distribution chamber 21, from where the ventilation air is distributed to different nozzles in the vehicle passenger compartment.

The distribution chamber 21 comprises a cylindrical compartment formed in the ventilation housing 1, in the periphery of said compartment there being arranged an air inlet 23 and three air outlets 24,25,26. The inlet 23 and the three outlets 24,25,26 are all arranged within different angular sectors A, B, C, D of said distribution chamber 21, measured from a centerline 4 of said distribution chamber 21. A distribution flap 22 is pivotably mounted in the distribution chamber 21, for controlling and distributing inflowing air to the different outlets, which comprise a fascia board outlet 24, a floor outlet 25 and/or a defroster outlet 26. The three outlets 24,25,26 are placed within a sector of 180° or less, while the inlet 23 is placed outside said sector. The defroster outlet 26 and the floor outlet 25 are placed within a sector of 90° or less, while the defroster outlet 26, the floor outlet 25 and the inlet 23 are placed within a sector of 180° or less. A further angular relationship is that the inlet 23 and the fascia board outlet 24 are placed within a sector of 180° or less.

The distribution flap 22 arranged in the distribution chamber 21 preferably comprises a substantially flat rectangular plate which is attached to a flap shaft 27, which is pivotably mounted in the ventilation housing 1 in register with the centreline 4 of the chamber 21. The distribution flap 22, as well as the other flaps 13,16 arranged in the ventilation housing 1, is provided with a foam plastics coating 11 which is adhered to the flap 22. This is to improve the seal when the flap 22 assumes a closed position.

As previously mentioned, the flap shaft 27 is pivotably mounted in the housing halves 2, the flop shaft 27 also projecting outside the ventilation housing 1. A gearwheel 60 is attached to said projecting portion of the flap shaft 27, said gearwheel 60 mating with a toothed sector 63 pivotably mounted on a fixed stub shaft 64 in the ventilation housing 1. The toothed sector 63 is axially locked in position by a stop collar 65. One end of a wire 67 is attached to one side of the toothed sector 63, the wire 67 being provided with a casing 69, which is clamped by a clip 70 to the ventilation housing 1. The other end of the wire 67 is conventionally attached to a sliding control 29 incorporated in a control panel 28 on the vehicle fascia board, this connecting being apparent from FIGS. 3 and 4. The sliding control 29 is pivotably mounted at its inner end on a bearing stub 78 fixed to the fascia board 28, and the operating arm of said sliding control 29 is displaceably arranged in a vertical slit 77 in the control panel 28. For a vertical displacement of the control 29, its arm will pivot about the bearing stub 78, whereby the wire 67 will actuate the toothed sector to turn about its stub shaft 64. The gearwheel 60 and the distribution flap 22 connected to it are thereby given a turning motion proportional to the displacement of the sliding control 29, since the gearwheel 60 is in mesh with the toothed sector 63. Different positions of the sliding control 29 will thus correspond to different angular positions of the distribution flap 22 in the distribution chamber 21.

When the sliding control 29 is caused to assume a lower position 31 in the control panel 28, a so-called O-position, the distribution flap 22 assumes an angular position 32 which closes the communication between the inlet 23 and the respective outlet 24,25,26 in the distribution chamber 21. In said position, which in FIG. 4 is denoted by the numeral 31 and a logical symbol in the form of a ring at the bottom of the panel, the distribution flap 22 engages sealingly against two stops 33, 34 attached to the distribution chamber 21. For successive upward displacement of the sliding control 29, the distribution flap 22 will be rotated clockwise. In a position corresponding to approximately one-third of the maximum travel of the sliding control 29, the distribution flap 22 assumes an angular position 36, when all ventilation air passes to the fascia outlet 24, said position being called the fascia position and being denoted in FIG. 4 by the numeral 35 and a logical symbol in the form of two triangles with the apexes directed away from each other.

On continued displacement of the sliding control 29 to a position approximately corresponding to two-thirds of maximum control travel, the distribution flap 22 assumes an angular position 38 where ventilation air is partly taken to the floor outlet 25 and partly to the defroster outlet 26. Said position is called the floor position and is denoted in FIG. 4 by the numeral 37 and a logical symbol in the form of a triangle with its apex directed downwards. In the upper end position 39 of the sliding control 29, the distribution flap 22 assumes an angular position 40 where air is only supplied to the defroster outlet 26. Said position is called the defroster position, and the corresponding control position in FIG. 4 is denoted by the numeral 39 and a logical symbol in the form of a triangle with an upwardly directed apex.

The sliding control 29 and the distribution flap 22 can also assume different intermediate positions relative to the above-mentioned basic positions, and in such positions the ventilation air is distributed to the different outlets 24, 25,26 in proportion to the setting of the sliding control 29.

Ventilation air is distributed from the outlets 24,25,26 of the distribution chamber 21 to different nozzles in the vehicle passenger compartment. Air is thereby distributed to the fascia nozzles via a ventilation duct 43 transverse to the vehicle, said duct being directly connected to the ventilation housing 1. Distribution of ventilation air to the vehicle floor nozzles takes place via a duct 44, built into the ventilation housing 1. The ventilation housing 1 is formed such that a closed space 45 is formed between the distribution duct 44 to the floor nozzles and the actual ventilation housing 1, this space 45 leading air from the outlet 26 to defroster outlets. In said space 45, the ventilation housing 1 is formed with a connection piece 46 to which a hose is connected for leading air to defroster outlets.

A control panel (not shown) including a push control with which flaps 13,16 can be set in different positions is arranged on the vehicle fascia board for operating the flaps 13,16 regulating the air flow in the hot air duct 12. This signifies that the ventilation air can be caused to pass either through the cold air duct 10 or through the hot air duct 12. In intermediate positions, the ventilation air can be divided up to pass with one portion through the cold air duct 10 and a second portion through the hot air duct 12, whereby the air taken to the vehicle passenger compartment can be heated as desired. Since said flap function is conventional and not of importance for understanding the present invention, it is not described any further.

The present invention can, within the scope of the patent claims, be formed in other ways than described in the example. For example, the outlets 24,25,26 from the distribution chamber 21 can be connected to other nozzles than those exemplified in the description. Similarly, the regulation of the distribution flap 22 can be done by means of a twist control known per se, instead of the sliding control 29 which is exemplified. In such a case, a turning motion for a control can be transferred to the distribution flap 22 via a conventional mitre gear.

What we claim is:

1. An arrangement for distributing ventilation air in a vehicle, comprising a ventilation housing formed with a substantially cylindrical distribution chamber having an inlet located in its cylindrical surface, and a number of outlets also located in its cylindrical mantle surface, a distributing flap extending in a longitudinal direction in said distribution chamber and being pivotable supported by said ventilation housing about a centerline of said distribution chamber, wherein said inlet and each of said outlets are arranged at different angular sectors of said distribution chamber and wherein at least three of said outlets from said distribution chamber are arranged within an angular sector of 180° or less, each of said outlets from said distribution chamber being arranged, via separate ducts, to open out at given outlet locations in a passenger compartment of the vehicle.

2. An arrangement as claimed in claim 1, wherein said distribution flap comprises a flat plate fitted diametrically in said longitudinal direction of said distribution chamber.

3. An arrangement as claimed in claim 1, wherein two of said outlets are arranged within an angular sector of 90° or less.

4. An arrangement as claimed in claim 3, wherein said inlet to said distribution chamber and two of said outlets therefrom are arranged within an angular sector of 180° or less.

5. An arrangement as claimed in claim 3, wherein said inlet and one of said outlets are arranged within an angular sector of 180° or less, while the remaining of said outlets are arranged within a remaining angular sector of said distribution chamber.

6. A ventilation air distribution system for a vehicle passenger compartment comprising: a housing having curved wall portions which define an internal substantially cylindrical air distribution chamber having a longitudinal axis, said distribution chamber having a single air inlet opening, said inlet opening facing radially and being defined by said curved wall portions, said distribution chamber also having first, second and third radially facing air outlet opening lying in a common radial plane with said inlet opening and defined by said curved wall portions, each of said outlet openings being in communication with a respective duct for conducting air to a given passenger-compartment location, each of said three air outlet openings being located within a different angular sector as measured from said longitudinal axis of said distribution chamber, all of said three air outlet openings being located within an angular sector of 180° or less and two of said outlet openings arranged within a sector of 90° or less measured from said longitudinal axis of said distribution chamber; said inlet opening being located in a different angular sector than said outlet openings, measured from said longitudinal axis of said distribution chamber, and an air distributing flap in the form of a flat plate in said distribution chamber, said flap extending longitudinally and diametrically in said distribution chamber and having opposite edges located close to said curved wall portions, said flap having a thickness dimension less than the transverse dimension of said air outlet openings and said flap being pivotably supported for rotation about said longitudinal axis of said distribution chamber for directing air from said air inlet opening, through said distribution chamber, to said outlet openings in a selective manner depending on the rotative position of said flap, the arrangement of said flap and said inlet and outlet openings being such that in a first rotative position of said flap the flow of air is blocked to all of said outlet openings, in a second rotative position of said flap all air flows from said inlet to said first outlet, in a third rotative position of said flap air flows from said inlet partly to said second outlet and partly to said third outlet but the flow of air to said first outlet is blocked, and in a fourth rotative position all air flows to said third outlet with the flow of air to said first and second outlets being blocked.

7. An air distribution system as in claim 6, wherein the arrangement of said flap and said inlet and outlet openings is such that when said flap is between said first and second rotative positions some air flows to said first outlet while said second and third outlets remain blocked, when said flap is between said second and third rotative positions some air flows to each of said outlets, and when said flap is between said third and fourth rotative positions air flows partly to said second and third outlets while flow of air to said first outlet remains blocked.

8. A ventilation air distribution system for a vehicle passenger compartment comprising: a ventilation housing having a substantially cylindrical air distribution chamber with a cylindrical mantle surface and a longitudinal axis, said distribution chamber having an air inlet opening, and three air outlet openings located in its cylindrical mantle surface, said air outlet openings communicating with said inlet opening and each of said outlet openings being also in communication with a respective duct for conducting air to a given passenger-compartment location, said three air outlet openings being located within different angular sectors as measured from said longitudinal axis of said distribution chamber and said three air outlet openings being located within an angular sector of 180° or less measured from said longitudinal axis of said distribution chamber; said inlet opening being located in a different angular sector than said outlet openings, measured from said longitudinal axis of said distribution chamber, and an air distributing flap in said distribution chamber, said flap extending longitudinally in said distribution chamber and having opposite edges located close to said curved wall portions and said flap being pivotably supported for rotation about said longitudinal axis of said distribution chamber for directing air from said air inlet opening, through said distribution chamber, to said outlet openings depending on the rotative position of said flap, the arrangement of said flap and said openings being such that said flap also has a rotative position in which said flap blocks the flow of air to all said outlet openings.

9. An air distribution system as in claim 8 wherein said ventilation housing also defines an internal air mixing chamber which is adjacent said distribution chamber and in communication with said air inlet opening, said system further including a cold air duct and a hot air duct both having discharge portions in communication with said mixing chamber, a heat exchanger and means for selectively controlling the flow of air such that selected proportions of air in said cold air duct flow through said heat exchanger into the discharge portion of said hot air duct.

10. A ventilation air distribution system for a vehicle passenger compartment comprising: an inlet chamber which receives cold air from a fan; a mixing chamber having a longitudinal axis, an inlet end and an outlet end; a cold air duct having an inlet end in communication with the inlet chamber and an outlet end in communication with the inlet end of the mixing chamber; a hot air duct having an inlet end in communication with the inlet chamber and an outlet end in communication with the mixing chamber near the outlet end thereof; a heat exchanger in said hot air duct arranged between the ends thereof so that air flowing through said hot air duct passes through said heat exchanger; a first air flow flap at the junction of inlet chamber and the inlet end of the hot air duct mounted for pivotal movement between a first position in which all air from the inlet chamber flows into the mixing chamber and a second position in which all air from the inlet chamber flows into the hot air duct; a second air flow flap at the junction of the outlet end of the hot air duct and the mixing chamber mounted for pivotal movement to open and close the outlet end of the hot air duct; a linkage connected between the first and second air flow flaps and operative such that movement of said first flap from its first position to its second position occurs simultaneously with movement of said second flap from its closed to its open position; a substantially cylindrical air distribution chamber having a longitudinal axis and a radially facing inlet in communication with the outlet end of said mixing chamber, the axis of said mixing chamber passing through the inlet of said distribution chamber and being generally radial with respect to the axis of said distribution chamber; said distribution chamber having at least three radial outlets, a distributing flap extending in a longitudinal direction in said distribution chamber and being pivotably supported for rotation about the axis of said distribution chamber for directing air from the distribution chamber inlet through said distribution chamber to said outlets in a selective manner depending on the rotative position of said flap, said distribution chamber inlet and each of said outlets being arranged at different angular sectors of said distribution chamber and at least three of said outlets from said distribution chamber being arranged within an angular sector of 180° or less, the arrangement of said inlet and said outlets and said flap being such that in one position of said flap the flow of air to all said three outlets is blocked and in an least one other position the flow of air is directed to one of said outlets each of said outlets from said distribution chamber being arranged, via separate ducts, to open out at given outlet locations in a passenger compartment of the vehicle.

11. A ventilation air distribution system for a vehicle passenger compartment comprising: a housing having curved wall portions which define an internal substantially cylindrical air distribution chamber having a longitudinal axis, said distribution chamber having a single air inlet opening, said inlet opening facing radially and being defined by said curved wall portions, said distribution chamber also having first, second and third radially facing air outlet openings lying in a common radial plane with said inlet opening and defined by said curved wall portions, each of said outlet openings being in communication with a respective duct for conducting air to a given passenger-compartment location, each of said three air outlet openings being located within a different angular sector as measured from said longitudinal axis of said distribution chamber, all of said three air outlet openings being located within an angular sector of 180° or less and two of said outlet openings arranged within a sector of 90° or less measured from said longitudinal axis of said distribution chamber; said inlet opening being located in a different angular sector than said outlet openings, measured from said longitudinal axis of said distribution chamber, and an air distributing flap in said distribution chamber, said flap extending longitudinally and having opposite edges located close to said curved wall portions, said flap having a thickness dimension less than the transverse dimension of said air outlet openings and said flap being pivotably supported for rotation about said longitudinal axis of said distribution chamber for directing air from said air inlet opening, through said distribution chamber, to said outlet openings in a selective manner depending on the rotative position of said flap, the arrangement of said flap and said inlet and outlet openings being such that in a first rotative position of said flap the flow of air is blocked to all of said outlet openings, in a second rotative position of said flap all air flows from said inlet to said first outlet, in a third rotative position of said flap air flows from said inlet partly to said second outlet and partly to said third outlet but the flow of air to said first outlet is blocked, and in a fourth rotative position all air flows to said third outlet with the flow of air to said first and second outlets being blocked.

* * * * *